United States Patent [19]

Kinoshita et al.

[11] Patent Number: 5,117,707

[45] Date of Patent: Jun. 2, 1992

[54] TILTING STEERING COLUMN

[75] Inventors: Satoshi Kinoshita; Shoji Masaoka, both of Shizuoka, Japan

[73] Assignee: Fuji Kiko Company, Limited, Tokyo, Japan

[21] Appl. No.: 660,334

[22] Filed: Feb. 22, 1991

[30] Foreign Application Priority Data

| Feb. 23, 1990 | [JP] | Japan | 2-17871[U] |
| Feb. 23, 1990 | [JP] | Japan | 2-17872[U] |
| Feb. 23, 1990 | [JP] | Japan | 2-17873[U] |
| Aug. 31, 1990 | [JP] | Japan | 2-91985[U] |

[51] Int. Cl.⁵ ............................................. B62D 1/20
[52] U.S. Cl. ............................... 74/493; 280/775
[58] Field of Search .............. 74/493, 523; 280/775

[56] References Cited

U.S. PATENT DOCUMENTS

| 4,244,237 | 1/1981 | Sprunger | 74/493 |
| 4,307,626 | 12/1981 | Sanada et al. | 74/493 |
| 4,330,139 | 5/1982 | Katayama | 74/493 X |
| 4,396,207 | 8/1983 | Okamoto | 74/493 X |
| 4,472,982 | 9/1984 | Nishikawa | 74/493 |
| 4,541,298 | 9/1985 | Strutt | 280/775 X |
| 4,732,050 | 3/1988 | Vollmer | 280/775 X |
| 4,788,880 | 12/1988 | Kester | 74/493 |
| 4,915,412 | 4/1990 | Yuzuriha et al. | 280/775 |

Primary Examiner—Dirk Wright
Attorney, Agent, or Firm—Bachman & LaPointe

[57] ABSTRACT

A tilting steering column employing a bolt secured to provide a force required for a clamp member fixed to the vehicle to provide frictional clamping engagement with a bracket member to which the steering column is fixed. A tilt lever is mounted on the bolt to operate a cam mechanism having first and second cam members to retain and release the frictional clamping engagement. A resilient member is provided between the first and second cam members to provide a good feel during steering column tilting operation.

16 Claims, 13 Drawing Sheets

FIG. 2
*(PRIOR ART)*
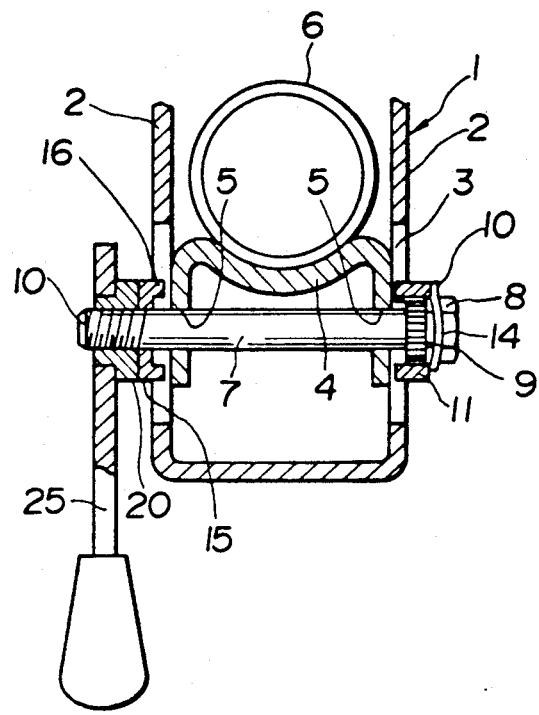
FIG. 3          FIG. 4
*(PRIOR ART)*   *(PRIOR ART)*
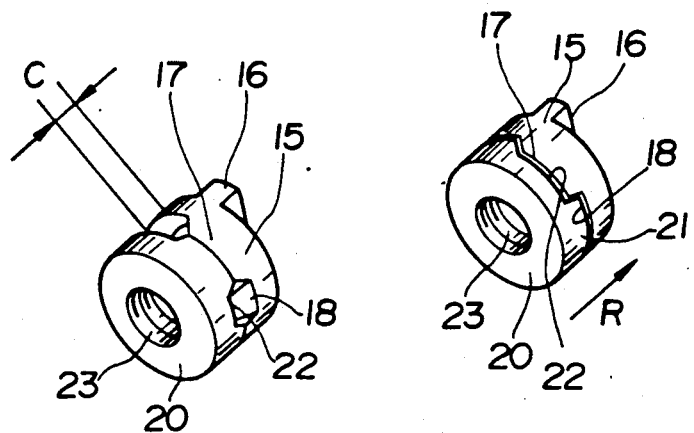

TILTING STEERING COLUMN

BACKGROUND OF THE INVENTION

This invention relates to a tilting steering column for use with automotive vehicles.

In order to adjust the steering column at an angle desirable for a driver to assure an optimum posture during vehicle driving, various tilting steering columns have been employed in automotive vehicles. For example, Japanese Utility Model Kokai Nos. 50-155726 and 51-85925 disclose a tilting steering column of the type employing a bolt secured to provide a force required for a clamp member fixed to the vehicle to provide frictional clamping engagement with a bracket member to which the steering column is fixed. A tilt lever is mounted on the bolt to operate a cam mechanism to retain and release the frictional clamping engagement. A serious problem associated with such a conventional tilting steering column is that the tilt lever rattles to provide a bad feel during steering column tilting operation.

SUMMARY OF THE INVENTION

Therefore, a main object of the invention is to provide an improved tilting steering column which can provide a good feel during steering column tilting operation.

There is provided, in accordance with the invention, a tilting steering column including a column jacket housing a steering shaft of an automotive vehicle. The tilting steering column comprises a bracket member to which the column jacket is fixed, a clamp member fixed to the vehicle for clamping the bracket member, a bolt extending through the bracket and clamp members, nut means for securing the bolt to produce a force required for the clamp member to provide frictional clamping engagement with the bracket member so as to fix the column jacket to the vehicle, and cam means having first and second members mounted on the bolt. The first member is held in contact with the clamp member. The second member is held in sliding engagement with the first member. The second member is movable between first and second positions. The second member is at the first position to retain the frictional clamping engagement. The second member is at the second position to decrease the force so as to release the frictional clamping engagement. At least one of the first and second members includes a resilient member held in resilient engagement with the other member. A lever is provided for moving the second member between the first and second positions.

In another aspect of the invention, the tilting steering column comprises a bracket member to which the column jacket is fixed, a clamp member fixed to the vehicle for clamping the bracket member, a bolt extending through the bracket and clamp members, nut means for securing the bolt to produce a force required for the clamp member to provide frictional clamping engagement with the bracket member so as to fix the column jacket to the vehicle, and a slider having an opening through which the bolt extends, the slider having a sliding surface for sliding contact with the clamp member. The sliding surface is coated with a material having a low frictional factor. A lever is provided at a one end thereof with a fixture portion mounted on the bolt for rotation about a rotation axis perpendicular to the axis of the bolt between first and second positions. The fixture portion being associated with the slider for sliding the slider on the clamp member. The fixture portion is at the first position to separate the slider a first distance from the rotation axis to retain the frictional clamping engagement. The fixture portion is at the second position to separate the slider a second distance smaller than the first distance so as to decrease the force and release the frictional clamping engagment.

In still another aspect of the invention, the tilting steering column comprises a bracket member to which the column jacket is fixed, a clamp member fixed to the vehicle for clamping the bracket member, a bolt extending through the bracket and clamp members, nut means for securing the bolt to produce a force required for the clamp member to provide frictional clamping engagement with the bracket member so as to fix the column jacket to the vehicle, and a slider having an opening through which the bolt extends. The slider has a sliding surface for sliding movement with respect to the clamp member. The tilting steering column also includes a lever provided at a one end thereof with a fixture portion mounted on the bolt for rotation about a rotation axis perpendicular to the axis of the bolt between first and second positions. The fixture portion is associated with the slider for sliding the slider on the clamp member. The fixture portion is at the first position to separate the slider a first distance from the rotation axis to retain the frictional clamping engagement. The fixture portion is at the second position to separate the slider a second distance smaller than the first distance so as to decrease the force and release the frictional clamping engagement. A washer member is mounted on the bolt between the clamp member and the slider. The washer member has a contact surface held in sliding contact with the sliding surface of the slider.

BRIEF DESCRIPTION OF THE DRAWINGS

This invention will be described in greater detail by reference to the following description taken in connection with the accompanying drawings, in which:

FIG. 2 is a fragmentary sectional view of the conventional tilting steering column;

FIGS. 3 and 4 are perspective views showing different positions of the cam assembly used in the conventional tilting steering column;

DETAILED DESCRIPTION OF THE INVENTION

Figure 1:
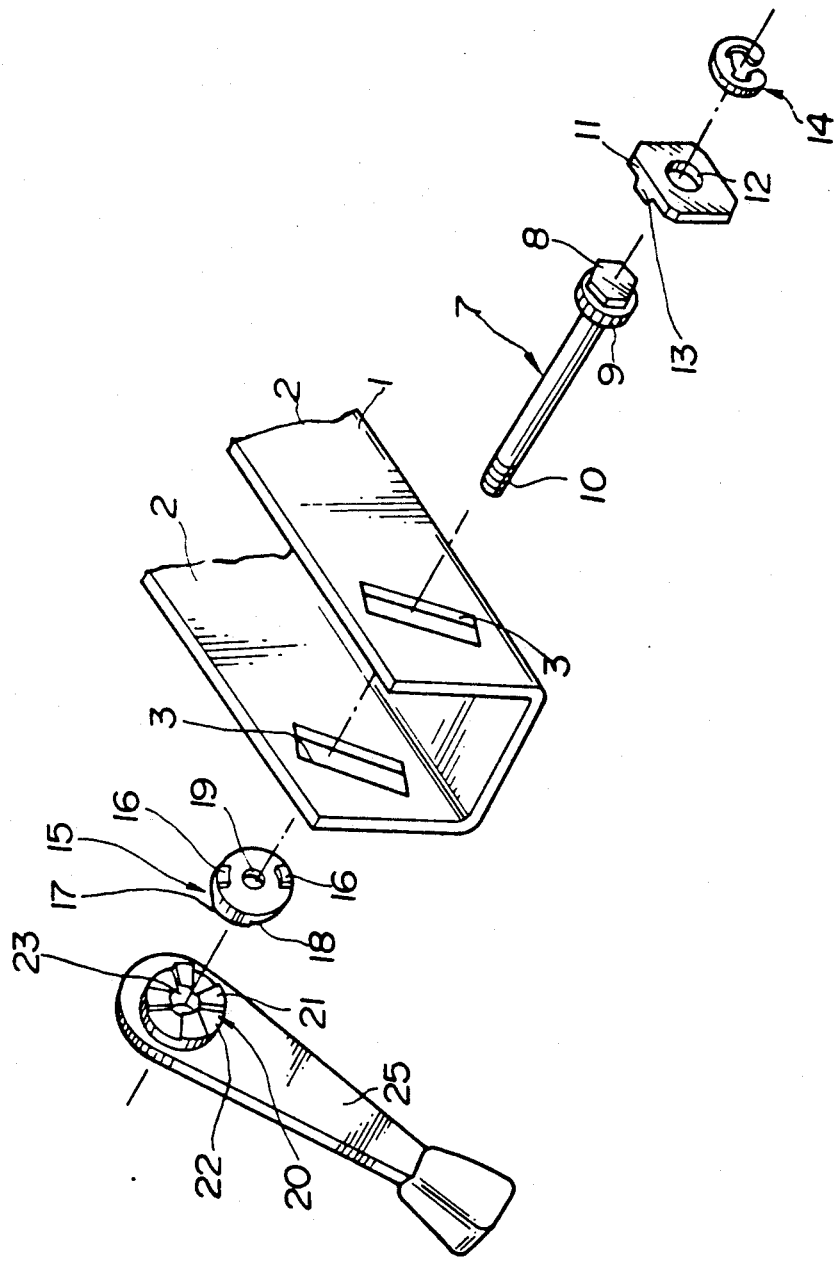
FIG. 1 is an exploded perspective view showing a significant portion of a conventional tilting steering column.
Figure 5:
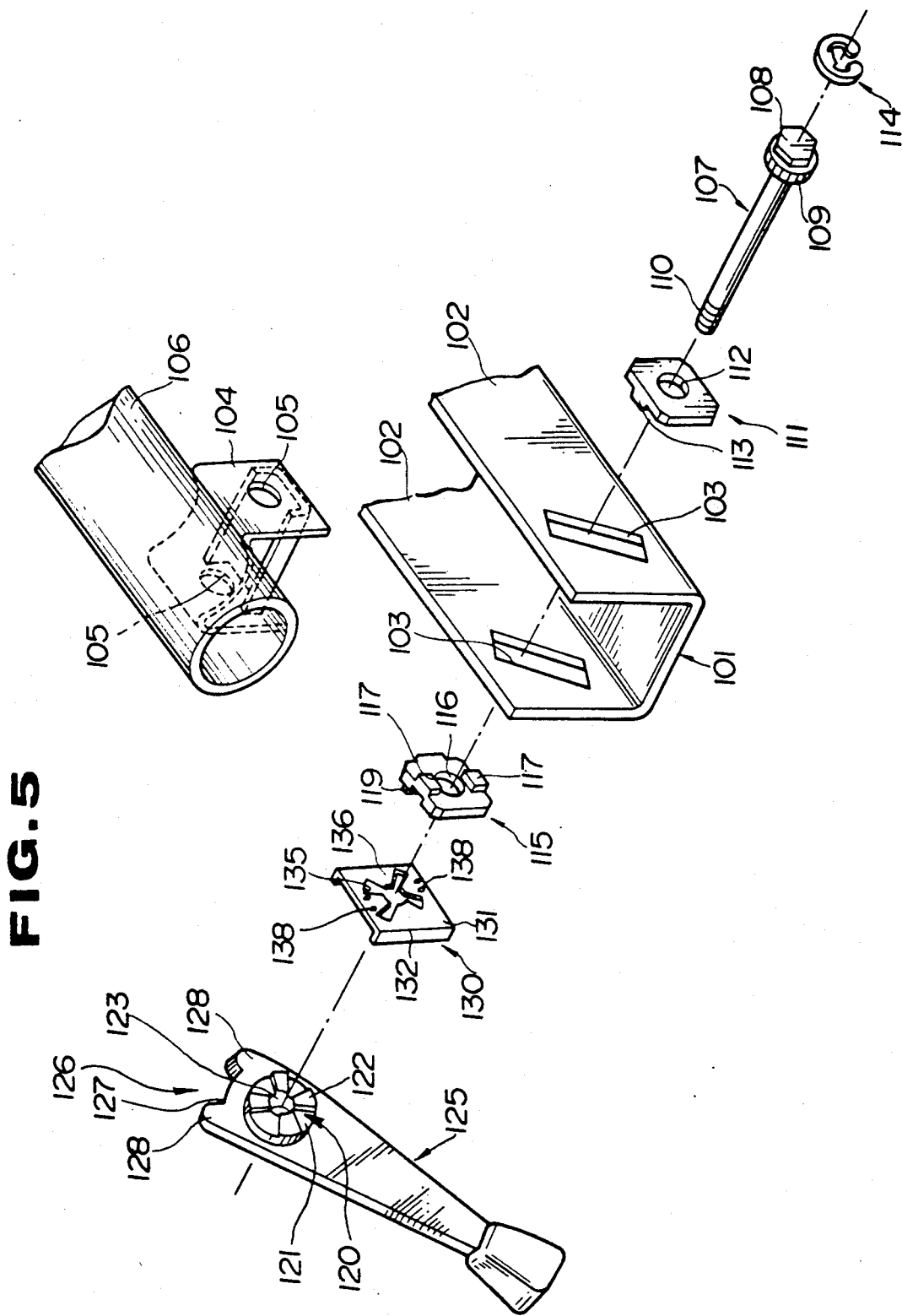
FIG. 5 is an exploded perspective view showing a significant portion of a tilting steering column embodying the invention.
Figure 6:
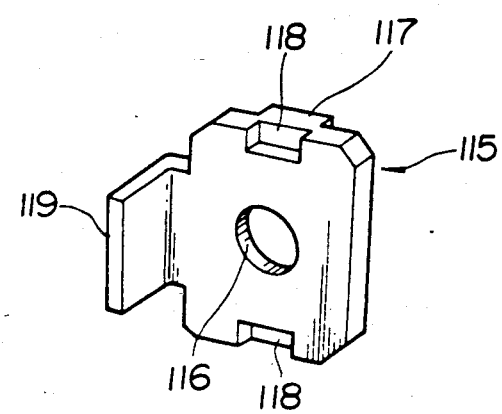
FIG. 6 is a perspective view showing the second guide member used in the tilting steering column of FIG. 5.
Figure 7:
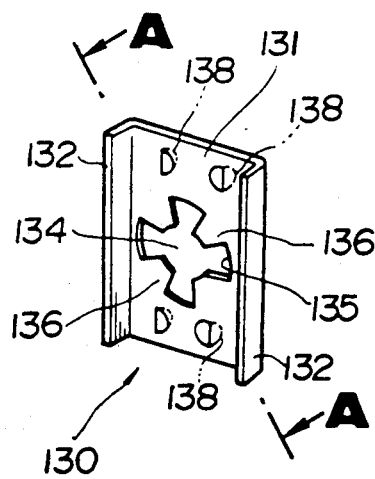
FIG. 7 is a perspective view showing the resilient member used in the tilting steering column of FIG. 5.

Prior to the description of the preferred embodiments of the present invention, the prior art tilting steering column of FIGS. 1 to 4 is briefly described in order to provide a basis for a better understanding of the difficulties attendant thereon.

The prior art tilting steering column includes an upper clamp member 1 fixed to the vehicle. The upper clamp member 1 has upright wall portions 2 extending in spaced-parallel relation to each other for receipt of a distance bracket member 4 to which a column jacket 6 is fixed. Each of the upright wall portions 2 has an elongated rectangular opening 3. A bolt 7 is inserted in the rectangular opening 3 and secured by a nut member 20 to provide frictional forces under which the distance bracket member 4 is fixed between the upright wall portions 2 of the upper clamp member 1. The bolt 7 has a head 8, an externally threaded large diameter portion 9 formed adjacent to the head 8, and a threaded end portion 10. The threaded large diameter portion 9 is threadably engaged with an internally threaded opening 12 formed in a first guide member 11. The first guide member 11 has projections 13 for engagement with one of the rectangular through hole 3 to permit movement of the first guide member 11 along the opening 3 and prevent rotation of the first guide member 11. Thus, the first guide member 11 is effective to prevent rotation of the bolt 7. An E ring 14 is placed to provide a resilient force between the bolt head 8 and the first guide member 11. A second guide member 15 is provided on the bolt 7. The second guide member 15 has a circular hole 19 having a size suitable for insertion of the bolt 7. The second guide member 15 has projections 16 on its one side for engagement with the other rectangular opening 3 to permit movement of the second guide member 15 along the opening 3 and prevent rotation of the second guide member 15 and a cam surface formed with projections 17 and recesses 18 on the other side thereof for engagement with a cam surface formed with projections 21 and recesses 22 on one side of the nut member 20. The nut member 20 has an internally threaded opening 23 for engagement with the externally threaded portion 10 of the bolt 7. The nut member 20 is secured to a tilt lever 25.

The nut member 20 is normally in a first position, as shown in FIG. 3, where its projections 21 engages with the projections 17 of the second guide member 15 to provide a space C. At the first position, the upper clamp member 1 clamps the distance bracket member 4 between the upright wall portions 2. When the driver rotates the tilt lever 25 in a direction retarding the nut member 20 to a second position, as best shown in FIG. 4, where the projections 21 come into engagement with the recesses 18 of the second guide member 15 to release the frictional clamping engagement of the upper clamp member 1 with the distance bracket member 4. At this second position, the driver can tilt the steering column at a desired angle. To set the steering column at the desired angle, the driver may rotate the tilt lever 25 to return the nut member 20 from the second position to the first position where the upper clamp member 1 clamps the distance bracket member 4 between the upright side portions 2 under frictional forces.

With such a conventional tilting steering column, however, the danger exists that the tilt lever 25 interferes with the shell cover or instrument panel since the tilt lever movement is not limited. Furthermore, the tilt lever 25 rattles at the second position. This rattling provides a bad feel to the driver during the steering column tilting operation.

Referring to FIGS. 5 to 8, there is shown a first embodiment of a tilting steering column made in accordance with the invention. The tilting steering column includes an upper clamp member 101 fixed to the vehicle. The upper clamp member 101 has a pair of upright wall portions 102 extending in spaced-parallel relation to each other for receipt of a distance bracket member 104 to which a column jacket 106 is fixed. Each of the Each of the upright wall portions 102 has an elongated rectangular opening 103. A bolt 107 is inserted in the rectangular openings 103 formed in the upper clamp member 101 and square openings 105 formed in the distance bracket member 104 and it is secured by a nut member 120 to produce a force required for the upper clamp member 101 to provide frictional clamping engagement with the distance bracket member 104.

The bolt 107 has a head 108, an externally threaded large diameter portion 109 formed adjacent to the head 108, and a threaded end portion 110. The threaded large diameter portion 109 is threadably engaged with an internally threaded center opening 112 formed in a first guide member 111. The first guide member 111 has projections 113 for engagement with one of the rectangular through hole 103 to permit movement of the first guide member 111 along the rectangular opening 103 and prevent rotation of the first guide member 111. Thus, the first guide member 111 is effective to prevent rotation of the bolt 107. An E ring 114 is placed to provide a resilient force between the bolt head 108 and the first guide member 111. A second guide member 115 is provided on the bolt 107. The second guide member 115 has a circular center opening 116 having a size suitable for insertion of the bolt 107. The second guide member 115 has projections 117 extending from its one flat surface for engagement with the other rectangular opening 103 to permit movement of the second guide member 115 along the rectangular opening 103 and prevent rotation of the second guide member 115 and recesses 118 formed in the other flat surface thereof. The second guide member 115 also has a stopper 119 extending from one side of the other flat surface of the second guide member 115.

Figure 8:
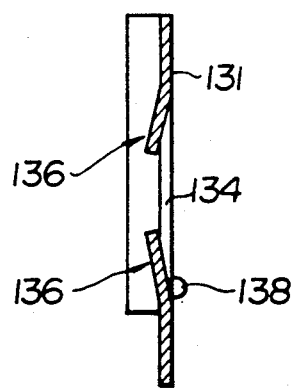
FIG. 8 is a sectional view of the resilient member.

A spacer 130 is provided on the bolt 107 between the second guide member 115 and the nut member 125. The spacer 130 is made of spring steel or the like and its has a flat portion 131 for abutment on the other flat surface of the second guide member 115 and a pair of flanges 132 turned at right angles on the opposite sides of the flat portion 131. The flat portion 131 is formed with an opening 134 conforming generally to a projection pattern formed on one side surface 121 of the nut member 120. In the illustrated case, the projection pattern includes four radially extending sector projections 122. The opening 134 has a circular center opening and sector openings 135 extending radially and outwardly from the circular center opening to form projections or tongues 136 between adjacent sector openings 135. The tongues 136 are struck inwardly from the plane of the flat portion 131, as best shown in FIG. 8. The spacer 130 also has two pairs of projections 138 struck outwardly from the plane of the flat portion 131 for resilient gripping engagement with the recesses 118 of the second guide member 115 to fix the spacer 130 to the second guide member 115.

The nut member 120 has an internally threaded center opening 123 for engagement with the externally threaded portion 110 of the bolt 107. The nut member 120 is secured to a tilt lever 125. The tilt lever 125 is formed at its tip end with a recess 126 defined by an arcuate bottom surface 127 and projections 128 formed on the opposite sides of the arcuate bottom surface 127. The recess 126 receives the stopper 119 of the second guide member 115. The arcuate bottom surface 128 slides the stopper 119 with rotation of the tilt lever 125 about the bolt 107. The projections 128 constitute the limits of rotation of the tilt lever 125.

The nut member 120 is normally in a first position where its projections 122 are in resilient engagement with the respective struck tongues 136 to retain a force required for the upper clamp member 101 to provide frictional clamping engagement with the distance bracket member 104 so as to fix the distance bracket member 104 to the upper clamp member 101. In the first position, the stopper 119 of the second guide member 115 abuts on one of the projections 128 to limit further rotation of the tilt lever 125. When the driver rotates the tilt lever 125 in a direction retarding the nut member 120, the projections 122 come into engagement with the opening 134 to decrease the distance of the nut member 120 with respect to the upper clamp member 101. This decreases the force applied between the upright wall portions 102 of the upper clamp member 101 to an extent releasing the frictional clamping engagement of the upper clamp member 101 with the distance bracket member 104 and permits the driver to tilt the steering column at a desired angle. In the second position, the stopper 119 abuts on the other projection 128 to limit further rotation of the tilt lever 125. To set the steering column at the desired angle, the driver may rotate the tilt lever 125 in the reverse direction to return the nut member 20 from the second position to the first position where the force increases to an extent sufficient for the upper clamp member 101 to provide frictional clamping engagement with the distance bracket member 104 between the upright wall portions 102.

According to this embodiment, a spacer 130 made of a resilient plate is employed. Consequently, the cam portion for engagement with the cam surface formed in the nut member 120 can easily be produced with higher accuracy than that of the second guide member 15 used in the conventional tilting steering column. In addition, the resilient spacer 130 provides a resilient force to the upper clamp member 101. This is effective to minimize the tendency of the tilt lever 125 to rattle and provide a good feel during steering column tilting operation.

Figure 9:
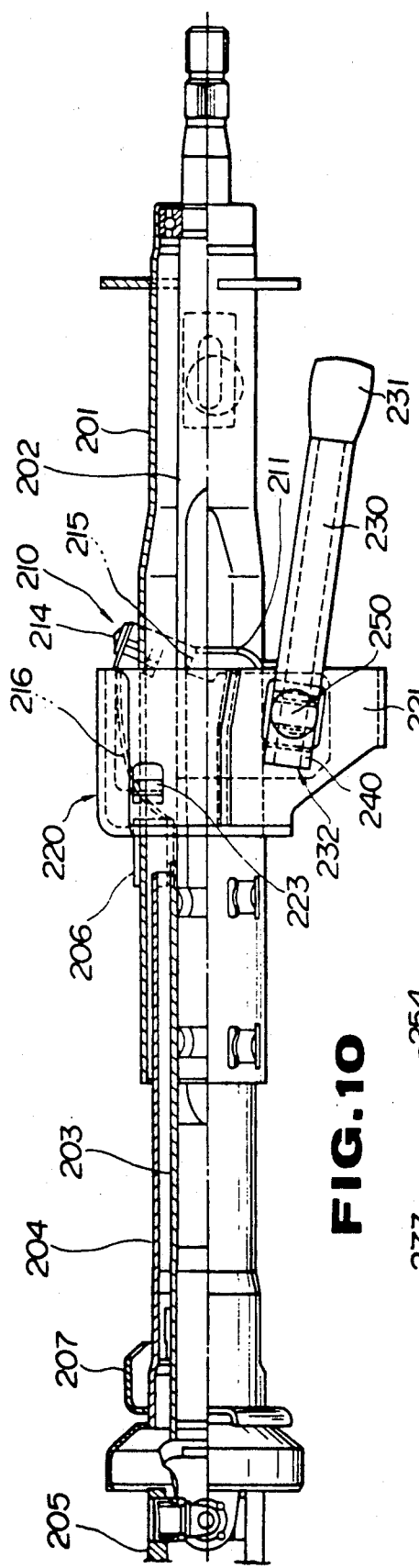
FIG. 9 is a fragmentary sectional view showing a second embodiment of the tilting steering column of the invention.
Figure 10:
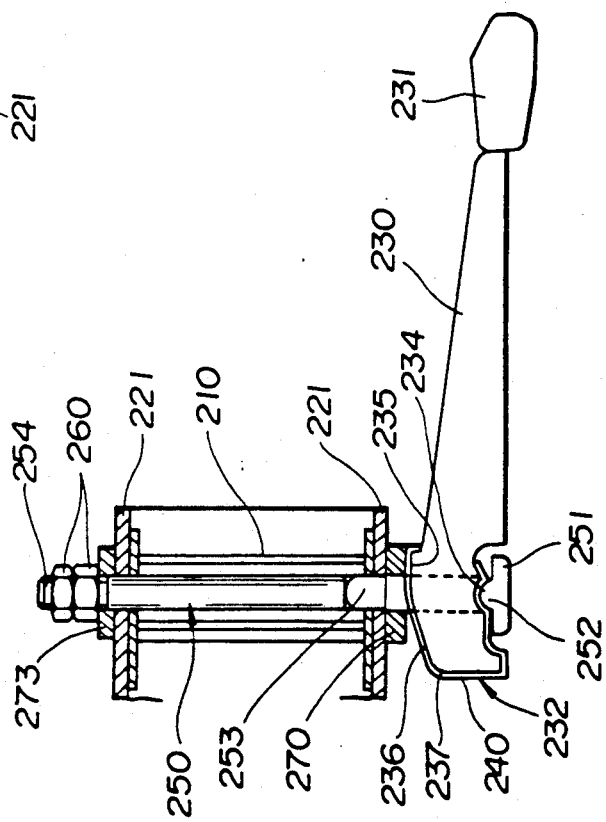
FIG. 10 is a sectional view showing a significant portion of the tilting steering column of FIG. 9.
Figure 11:
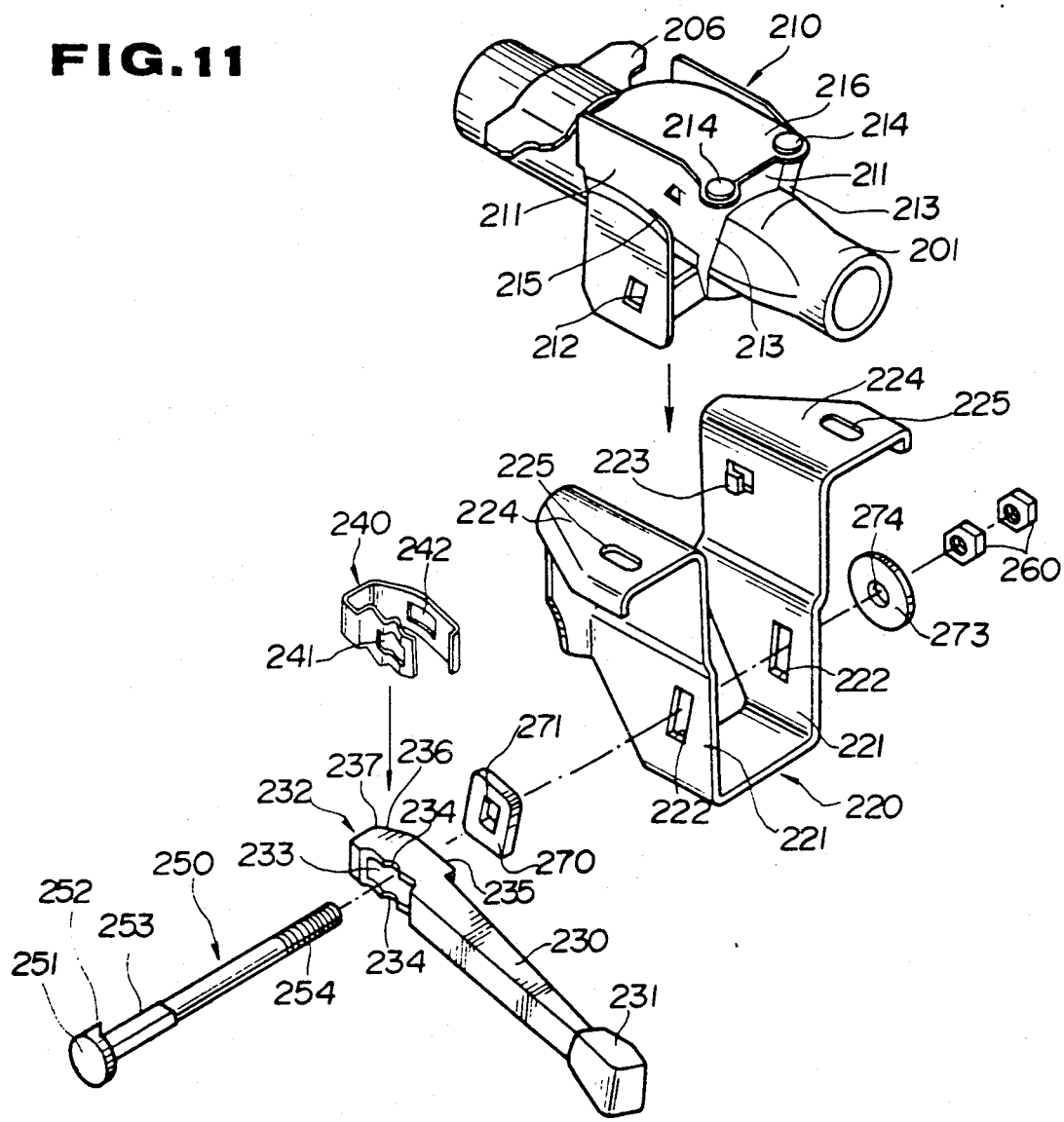
FIG. 11 is an exploded perspective view showing a significant portion of the tilting steering column of FIG. 9.

Referring to FIGS. 9 to 11, there is shown a second embodiment of the tilting steering column of the invention. In this embodiment, the tilting steering column includes an upper jacket 201 which houses an upper shaft 202 supported coaxially and rotatably within the upper jacket 201. The upper shaft 202 has a steering wheel (not shown) fixed thereto at its upper end. The lower end of the upper shaft 202 fits into a lower shaft 203 for telescopic movement with respect to the lower shaft 203. The lower shaft 203 is housed and supported coaxially and rotatably within a lower jacket 204 which fits into the upper jacket 202 for telescopic movement with respect to the upper jacket 201. The lower shaft 203 is coupled at its upper end to the upper shaft 202 and at its lower end to a universal joint 205 so that rotation of the steering wheel is transmitted through the upper and lower shafts 202 and 203 to the universal joint 205.

The upper jacket 201 is fixed to a distance bracket member 210 which in turn is fixed to the vehicle through an upper clamp member 220. A holder 206 is fixed to the upper surface of the upper jacket 201 somewhere behind the distance bracket member 210. The lower jacket 204 is fixed to the vehicle through a lower clamp member 207. The lower clamp member 207 extends through the lower jacket 204 and it is welded thereto. The numeral 230 designates a tilt lever which has a fixture portion 232 formed at its one end and an operation knob 231 secured to the other end thereof. The fixture portion 232 is covered by a resilient cap 240 and pivoted on a bolt 250 extending through the distance bracket member 210 and the upper clamp member 220. The bolt 250 is secured by nuts 260 to produce a force required for the upper clamp member 220 to provide frictional clamping engagement with the distance bracket member 210. The bolt 250 and nuts 260 are equipped with washers 270 and 273, respectively.

As best shown in FIG. 11, the bolt 250 has a head portion 251, a root portion 253 having a square-shaped cross-sectional area, and a portion having a circular cross-sectional area and terminating in a threaded end portion 254. The head portion 251 has two arcuate projections 252 formed diagonally of thereof. The threaded end portion 254 is inserted in a through-hole 274 formed in the washer 273 and it engages with the nuts 260.

The distance bracket member 210 has a pair of upright wall portions 211 each having a square opening 212 having a size suitable for insertion of the square root portion 252 of the bolt 250. Preferably, the square openings 212 have a size equal or somewhat greater than that of the square root portion 253 to prevent the bolt 250 from rotating therein. The upright wall portions 211 extend in spaced-parallel relation to each other for receiving the upper jacket 201 between them. The upper jacket 201 is welded to the upright wall portions 211. The distance bracket member 210 is of the type having a safety structure for absorbing impact energy when the driver comes into collision against the steering wheel in a traffic accident. For this purpose, each of the upright wall portions 211 has a curled portion 213 through which a roller 214 extends and a slit 215. When the distance bracket member 210 is subject to impact energy, the upright wall portions 211 tear from the respective slits 215 and the curled portions 213 roll up with movement of the upper jacket 201 so as to absorb the impact energy. A cover 216, which may be made of a synthetic resin, is provided for covering the upper surface of the upper jacket 201. The cover 216 is formed in its front end portion with holes through which the respective rollers 214 extend and it extends to the holder 206.

The upper clamp member 220 has a pair of upright wall portions 221 each having a rectangular opening 222 and a projection 223 struck outwardly for resilient gripping engagement with the distance bracket member 210. The upright wall portions 221 extend in spaced-parallel relation to each other for receiving the distance bracket member 210 between them. Each of the upright wall portions 221 terminates in a wing portion 224 turned at right angles for contact with the vehicle. The upper clamp member 220 is fixed to the vehicle by means of bolts (not shown) inserted in bolt holes 225 formed in the respective wing portions 224. The rectangular openings 222 have a width suitable for insertion of the square root portion 253 of the bolt 250 and a length greater than the width for movement of the square root portion 253 in the direction of the length of the rectangular opening 222 during steering column tilting operation. The distance bracket member 210 is placed between the upright wall portions 221 of the upper clamp member 220. When the distance bracket member 210 is placed in position between the upright wall portions 221 of the upper clamp member 220, the square openings 212 are in alignment with the rectangular openings 222.

The fixture portion 232 of the tilt lever 230 has an opening 233 in which the square root portion 252 of the bolt 250 is inserted. Cutouts 234 are formed in the end surface of the wall defining the opening 233. The cutouts 234 conform generally to the arcuate projections 252 formed on the head portion 251 of the bolt 250 for engagement with the projections 252, respectively, so that the fixture portion 232 can rotate about an rotation axis extending in a direction normal to the axis of the bolt 250; that is, from the top of one of the arcuate projection 252 to the top of the other arcuate projection 252. The fixture portion 232 has three continuous flat surface portions referred to a contact surface portion 235, a slide surface portion 236 and an end surface portion 237. Normally, the contact surface portion 235 is held in parallel with the washer 270 to hold the tilt lever 230 in parallel with the upright wall portion 221 of the upper clamp member 220. The end surface portion 237 is substantially normal to the contact surface portion 235. The slide surface portion 236 extends between the contact and end surface portions 235 and 237 and it is inclined at an angle with respect to the contact surface portion 235. The resilient cap 240, which may be produced by pressing a plate made of spring steel or the like, is set on the fixture portion 232 to cover its peripheral surface including the contact surface portion 235, the slide surface portion 236 and the end surface portion 237. The resilient cap 240 has openings 241 and 242 positioned in alignment with the opening 233 of the fixture portion 232 of the tilt lever 230 when it is placed in position. The washer 270 has a square opening 271 having a size suitable for insertion of the square root portion 253 of the bolt 250.

Figure 12:
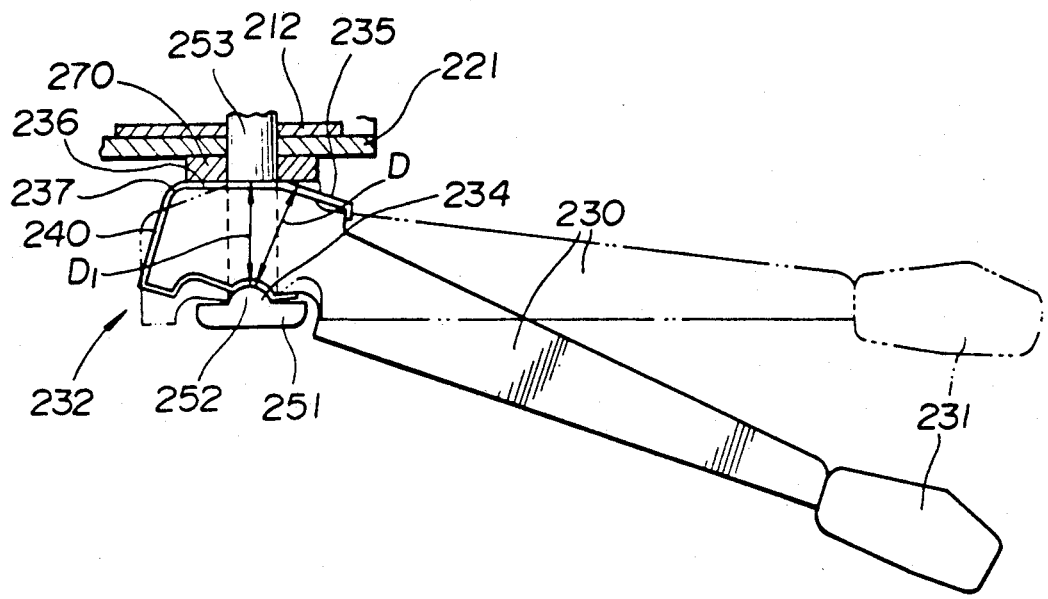
FIG. 12 is a sectional view used in explaining the operation of the tilting steering column of FIG. 9.

The steering column tiling operation will be described with reference to FIG. 12. The tilt lever 230 is normally in a first position where the washer 270 faces to the contact surface 235 through the resilient cap 240, as indicated by the phantom lines of FIG. 12. In the first position, the washer 270 is spaced a distance D away from the projections 252 to retain a force required for the upper clamp member 220 to provide frictional clamping engagement with the distance bracket 210 so as to fix the distance bracket 210 to the upper clamp member 220. When the driver operates the operation knob 231 to move the tilt lever 230 away from the upper clamp member 220 from the first position, the fixture portion 232 rotates about the arcuate projections 252 held in engagement with the respective recesses 234 formed in the fixture portion 232. Upon arrival of the tilt lever 230 at a second position indicated by the solid lines of FIG. 12, the washer 270 faces to the slide surface 236 through the resilient cap 240. In the second position, the washer 270 is spaced a distance D1 away from the projections 252. The distance D1 is smaller than the distance D. This decreases the force applied between the upright wall portions 221 of the upper clamp member 220 to an extent releasing the frictional clamping engagement of the upper clamp member 220 with the distance bracket member 210 and permits the driver to tilt the steering column at a desired angle. To set the steering column at the desired angle, the driver may operate the operation knob 231 to rotate the tilt lever 230 from the second position to the first position where the force increases to an extent sufficient for the upper clamp member 220 to provide frictional clamping engagement with the distance bracket member 210 between the upright wall portions 221.

In this embodiment, the fixture portion 232 and the washer 270 constitute a cam assembly for retaining and releasing the frictional clamping engagement of the upper clamp member 220 with the distance bracket member 210. The resilient cap 240 provides resilient engagement between the washer 270 and the fixture portion 232 and resilient engagement between the bolt head 251 and the fixture portion 232. This is effective to minimize the tendency of the tilt lever 230 to rattle and provide a good feed during steering column tilting operation. Furthermore, the use of the resilient cap permits the tilt lever 230 to move smoothly between the first and second positions even though the contact and sliding surface portions 235 and 236 are not finished to have a sufficient degree of flatness.

Figure 13:
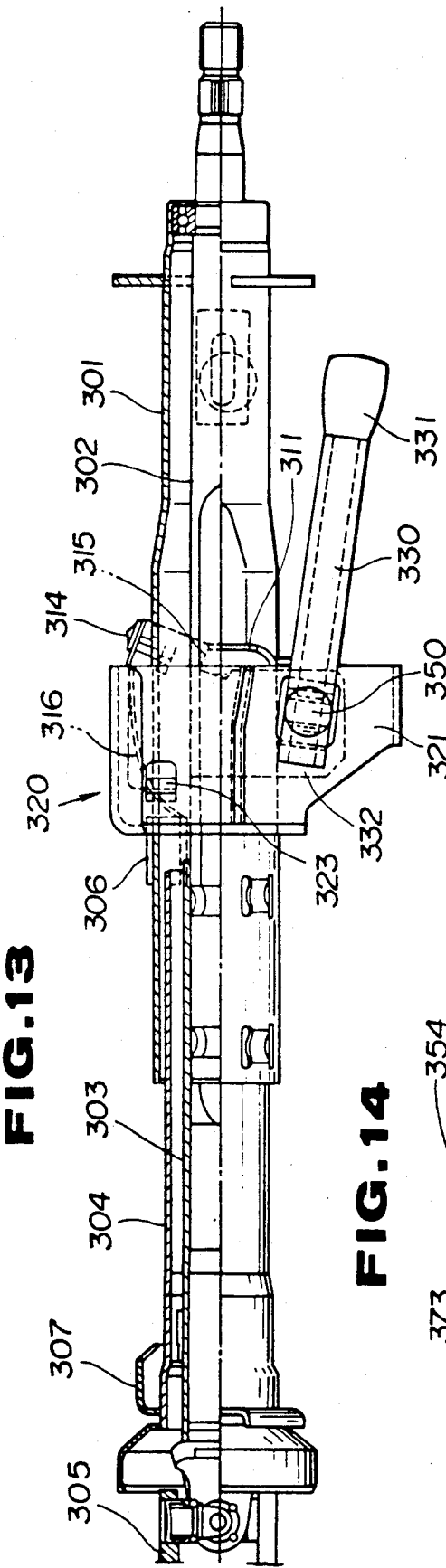
FIG. 13 is a fragmentary sectional view showing a third embodiment of the tilting steering column of the invention.
Figure 14:
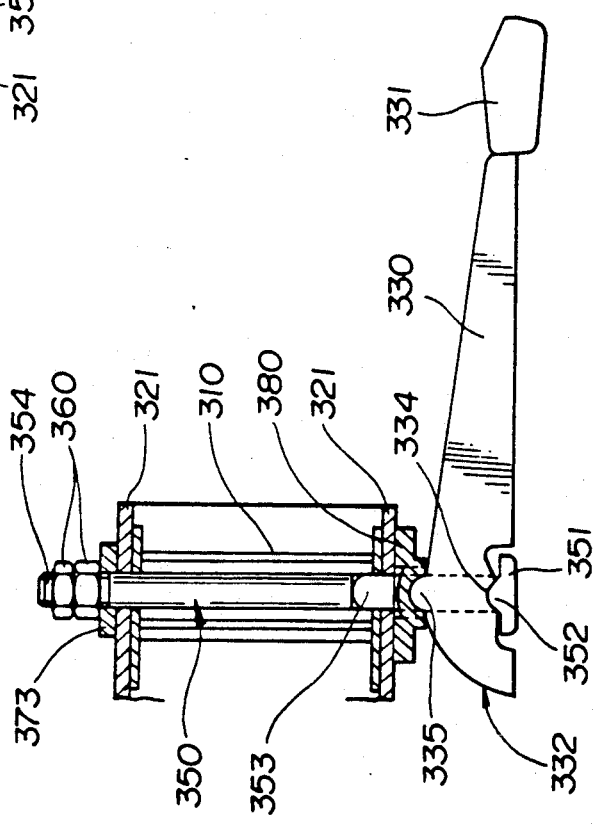
FIG. 14 is a sectional view showing a significant portion of the tilting steering column of FIG. 13.
Figure 15:
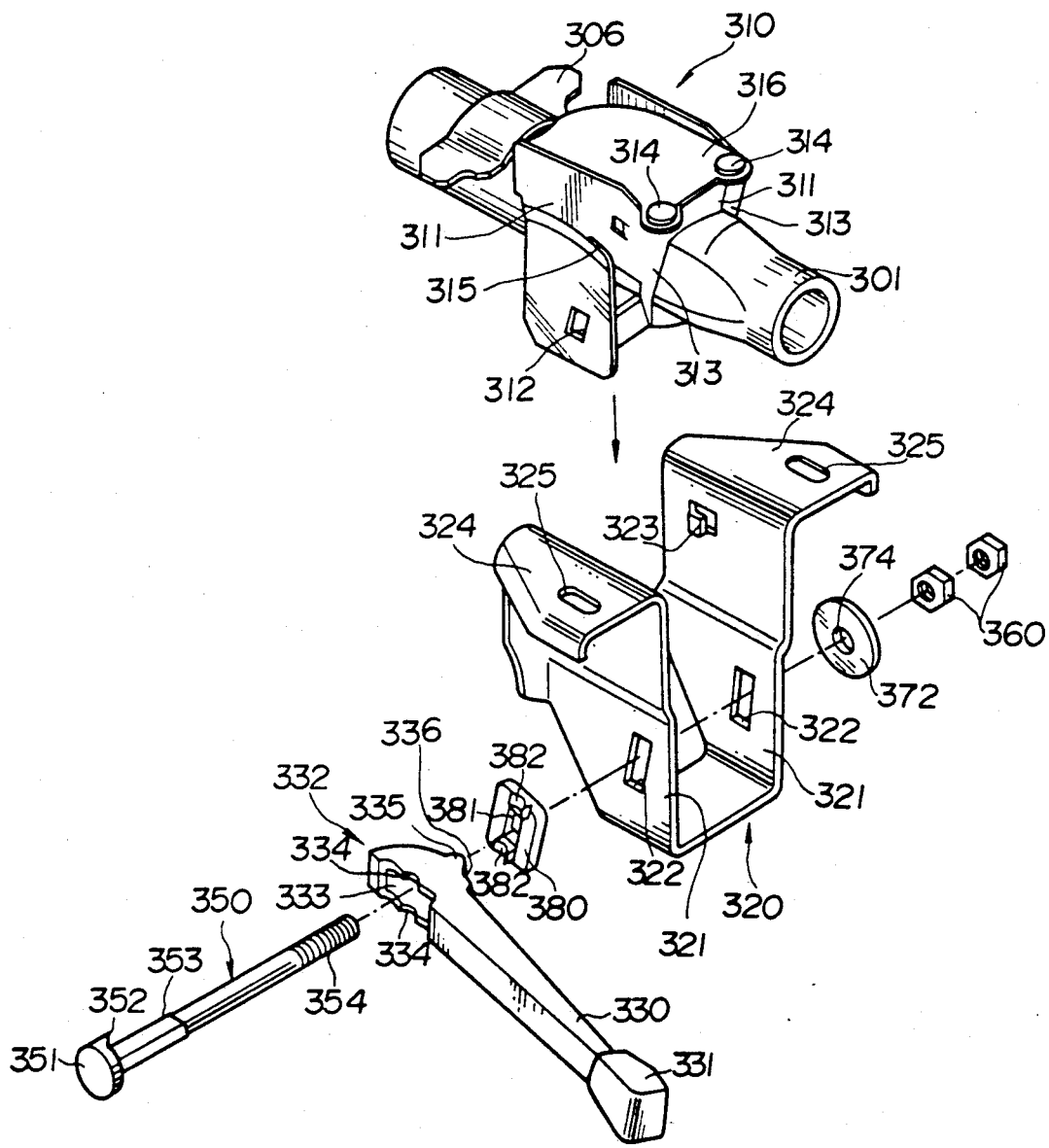
FIG. 15 is an exploded perspective view showing a significant portion of the tilting steering column of FIG. 13.
Figure 17:
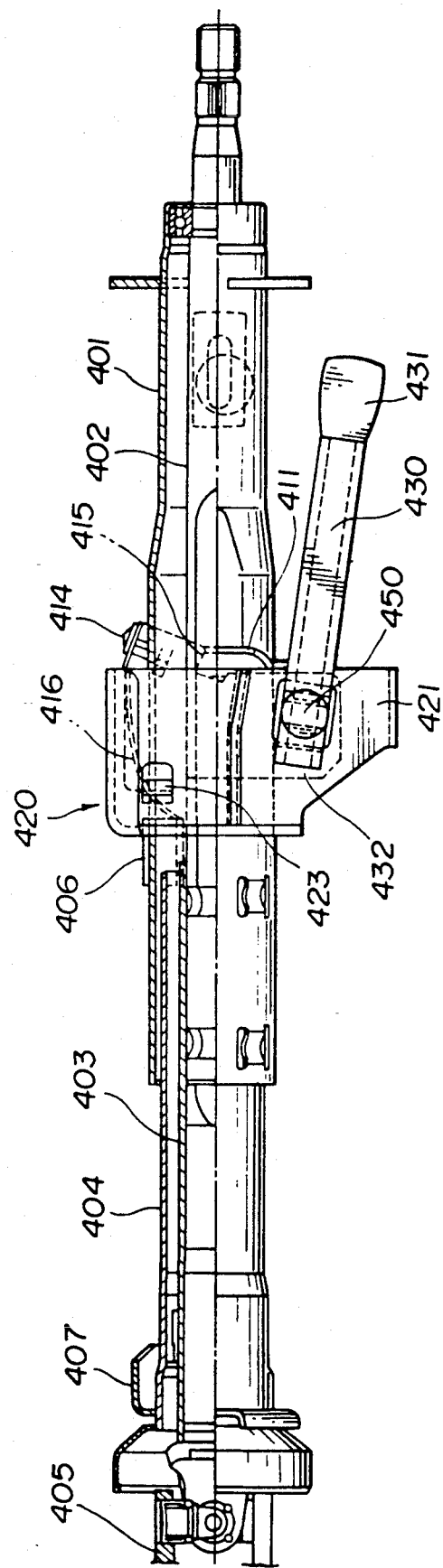
FIG. 17 is a fragmentary sectional view showing a fourth embodiment of the tilting steering column of the invention.

Referring to FIGS. 13 to 15, there is shown a third embodiment of the tilting steering column of the invention. In this embodiment, the tilting steering column includes an upper jacket 301 which houses an upper shaft 302 supported coaxially and rotatably within the upper jacket 301. The upper shaft 302 has a steering wheel (not shown) fixed thereto at its upper end. The lower end of the upper shaft 302 fits into a lower shaft 303 for telescopic movement with respect to the lower shaft 303. The lower shaft 303 is housed and supported coaxially and rotatably within a lower jacket 304 which fits into the upper jacket 302 for telescopic movement with respect to the upper jacket 301. The lower shaft 303 is coupled at its upper end to the upper shaft 302 and at its lower end to a universal joint 305 so that rotation of the steering wheel is transmitted through the upper and lower shafts 302 and 303 to the universal joint 305.

The upper jacket 301 is fixed to a distance bracket member 310 which in turn is fixed to the vehicle through an upper clamp member 320. A holder 306 is fixed to the upper surface of the upper jacket 301 somewhere behind the distance bracket member 310. The lower jacket 304 is fixed to the vehicle through a lower clamp member 307. The lower clamp member 307 extends through the lower jacket 304 and it is welded thereto. The numeral 330 designates a tilt lever which has a fixture portion 332 formed at its one end and an operation knob 331 secured to the other end thereof. The fixture portion 332 is pivoted on a bolt 350 extending through the distance bracket member 310 and the upper clamp member 320. The bolt 350 is secured by nuts 360 to produce a force required for the upper clamp member 320 to provide frictional clamping engagement with the distance bracket member 310. The nuts 360 are equipped with a washer 373. The numeral 380 designates a sliding plate provided on the bolt 350 between one of the upright wall portions 321 of the upper clamp member 320 and the fixture portion 332 of the tilt lever 330.

As best shown in FIG. 15, the bolt 350 has a head portion 351, a root portion 353 having a square-shaped cross-sectional area, and a portion having a circular cross-sectional area and terminating in a threaded end portion 354. The head portion 351 has two arcuate projections 352 formed diagonally of thereof. The threaded end portion 354 is inserted in a through-hole 374 formed in the washer 373 and it engages with the nuts 360.

The distance bracket member 310 has a pair of upright wall portions 311 each having a square opening 312 having a size suitable for insertion of the square root portion 352 of the bolt 350. Preferably, the square openings 312 have a size equal or somewhat greater than that of the square root portion 353 to prevent the bolt 350 from rotating therein. The upright wall portions 311 extend in spaced-parallel relation to each other for receiving the upper jacket 301 between them. The upper jacket 301 is welded to the upright wall portions 311. The distance bracket member 310 is of the type having a safety structure for absorbing impact energy when the driver comes into collision against the steering wheel in a traffic accident. For this purpose, each of the upright wall portions 311 has a curled portion 313 through which a roller 314 extends and a slit 315. When the distance bracket member 310 is subject to impact energy, the upright wall portions 311 tear from the respective slits 315 and the curled portions 313 roll up with movement of the upper jacket 301 so as to absorb the impact energy. A cover 316, which may be made of a synthetic resin, is provided for covering the upper surface of the upper jacket 301. The cover 316 is formed in its front end portion with holes through which the respective rollers 314 extend and it extends to the holder 306.

The upper clamp member 320 has a pair of upright wall portions 321 each having a rectangular opening 322 and a projection 323 struck outwardly for resilient gripping engagement with the distance bracket member 310. The upright wall portions 321 extend in spaced-parallel relation to each other for receiving the distance bracket member 310 between them. Each of the upright wall portions 321 terminates in a wing portion 324 turned at right angles for contact with the vehicle. The upper clamp member 320 is fixed to the vehicle by means of bolts (not shown) inserted in bolt holes 325 formed in the respective wing portions 324. The rectangular openings 322 have a width suitable for insertion of the square root portion 353 of the bolt 350 and a length greater than the width for movement of the square root portion 353 in the direction of the length of the rectangular opening 322 during steering column tilting operation. The distance bracket member 310 is placed between the upright wall portions 321 of the upper clamp member 320. When the distance bracket member 310 is placed in position, the square openings 312 are in alignment with the rectangular openings 322.

The fixture portion 332 of the tilt lever 330 has an opening 333 in which the square root portion 352 of the bolt 350 is inserted. Cutouts 334 are formed in the end surface of the wall defining the opening 333. The cutouts 334 conform generally to the arcuate projections 352 formed on the head portion 351 of the bolt 350 for engagement with the projections 352, respectively, so that the fixture portion 332 can rotate about an rotation axis extending in a direction normal to the axis of the bolt 350; that is, from the top of one of the arcuate projections 352 to the top of the other arcuate projection 352. The fixture portion 332 has a pair of arcuate projections 335 each having an arcuate sliding surface 336. The arcuate projections 335 extend in spaced-parallel relation to each other and extend in a direction parallel to the axis of the bolt 350.

The sliding plate 380 has a sliding surface for sliding contact with the adjacent upright wall portion 321 of the upper clamp member 320, and an opening 381 having a size suitable for loose insertion of the square root portion 353 of the bolt 350 so that it can slide on the adjacent upright wall portion 321 of the upper clamp member 320 with respect to the bolt 350. The sliding plate 380 has recesses 382 generally conforming to the arcuate projections 335 formed on the fixture portion 332 of the tilt lever 330 for sliding engagement with the projections 335, respectively. The sliding surface of the sliding plate 380 is coated with a material such as low frictional resin or the like having a low friction factor.

Figure 16:
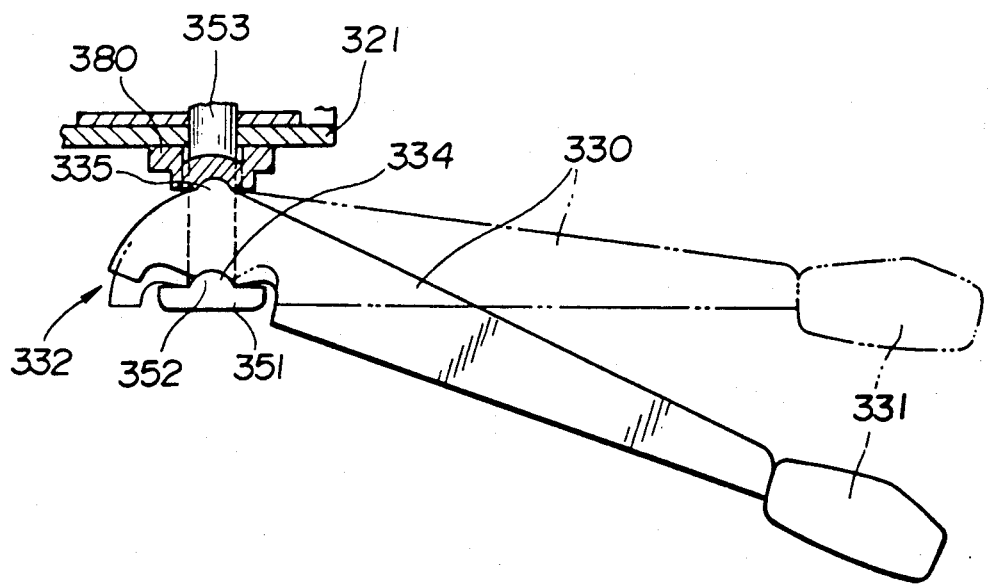
FIG. 16 is a sectional view used in explaining the operation of the tilting steering column of FIG. 13.

The steering column tilting operation will be described with reference to FIG. 16. The tilt lever 330 is normally in a first position where the projections 335 are in parallel with the axis of the bolt 350, as indicated by the phantom lines of FIG. 16. In the first position, the projections 335 separate the sliding plate 380 a first distance away from the rotation axis of the fixture portion 332 to retain a force required for the upper clamp member 320 to provide frictional clamping engagement with the distance bracket 310 so as to fix the distance bracket 310 to the upper clamp member 320. When the driver operates the operation knob 331 to move the tilt lever 330 away from the upper clamp member 320 from the first position, the fixture portion 332 rotates about the rotation axis (the arcuate projections 352) held in engagement with the respective recesses 334 formed in the fixture portion 332. As a result, the projections 335 are inclined with respect to the axis of the bolt 350 to slide the sliding member 380 on the adjacent upright wall portion 321 of the upper clamp member 320. Upon arrival of the tilt lever 330 at a second position indicated by the solid lines of FIG. 16, the sliding member 380 is spaced a second distance smaller than the first distance away from the rotation axis of the fixture portion 332 of the tilt lever 330. This decreases the force applied between the upright wall portions 321 of the upper clamp member 320 to an extent releasing the frictional clamping engagement of the upper clamp member 320 with the distance bracket member 310 and permits the driver to tilt the steering column at a desired angle. To set the steering column at the desired angle, the driver may operate the operation knob 331 to rotate the tilt lever 330 from the second position to the first position where the force increases to an extent sufficient for the upper clamp member 320 to provide frictional clamping engagement with the distance bracket member 310 between the upright wall portions 321.

In this embodiment, a material having a low friction factor is coated on the sliding surface of the sliding member 380 to provide smooth sliding movement of the sliding member 380 on the adjacent upright wall portion 321 of the upper clamp member 320 and minimize sliding member wear. This is effective to provide a good feed during steering column tilting operation.

Referring to FIGS. 17 to 20, there is shown a fourth embodiment of the tilting steering column of the invention. In this embodiment, the tilting steering column includes an upper jacket 401 which houses an upper shaft 402 supported coaxially and rotatably within the upper jacket 401. The upper shaft 402 has a steering wheel (not shown) fixed thereto at its upper end. The lower end of the upper shaft 402 fits into a lower shaft 403 for telescopic movement with respect to the lower shaft 403. The lower shaft 403 is housed and supported coaxially and rotatably within a lower jacket 404 which fits into the upper jacket 402 for telescopic movement with respect to the upper jacket 401. The lower shaft 403 is coupled at its upper end to the upper shaft 402 and at its lower end to a universal joint 405 so that rotation of the steering wheel is transmitted through the upper and lower shafts 402 and 403 to the universal joint 405.

The upper jacket 401 is fixed to a distance bracket member 410 which in turn is fixed to the vehicle through an upper clamp member 420. A holder 406 is fixed to the upper surface of the upper jacket 401 somewhere behind the distance bracket member 410. The lower jacket 404 is fixed to the vehicle through a lower clamp member 407. The lower clamp member 407 extends through the lower jacket 404 and it is welded thereto. The numeral 430 designates a tilt lever which has a fixture portion 432 formed at its one end and an operation knob 331 secured to the other end thereof. The fixture portion 432 is pivoted on a bolt 450 extending through the distance bracket member 410 and the upper clamp member 420. The bolt 350 is secured by nuts 460 to produce a force required for the upper clamp member 420 to provide frictional clamping engagement with the distance bracket member 410. The nuts 460 are equipped with a washer 473. The numeral 480 designates a sliding plate provided on the bolt 450 between one of the upright wall portions 421 of the upper clamp member 420 and the fixture portion 432 of the tilt lever 430.

Figure 20:
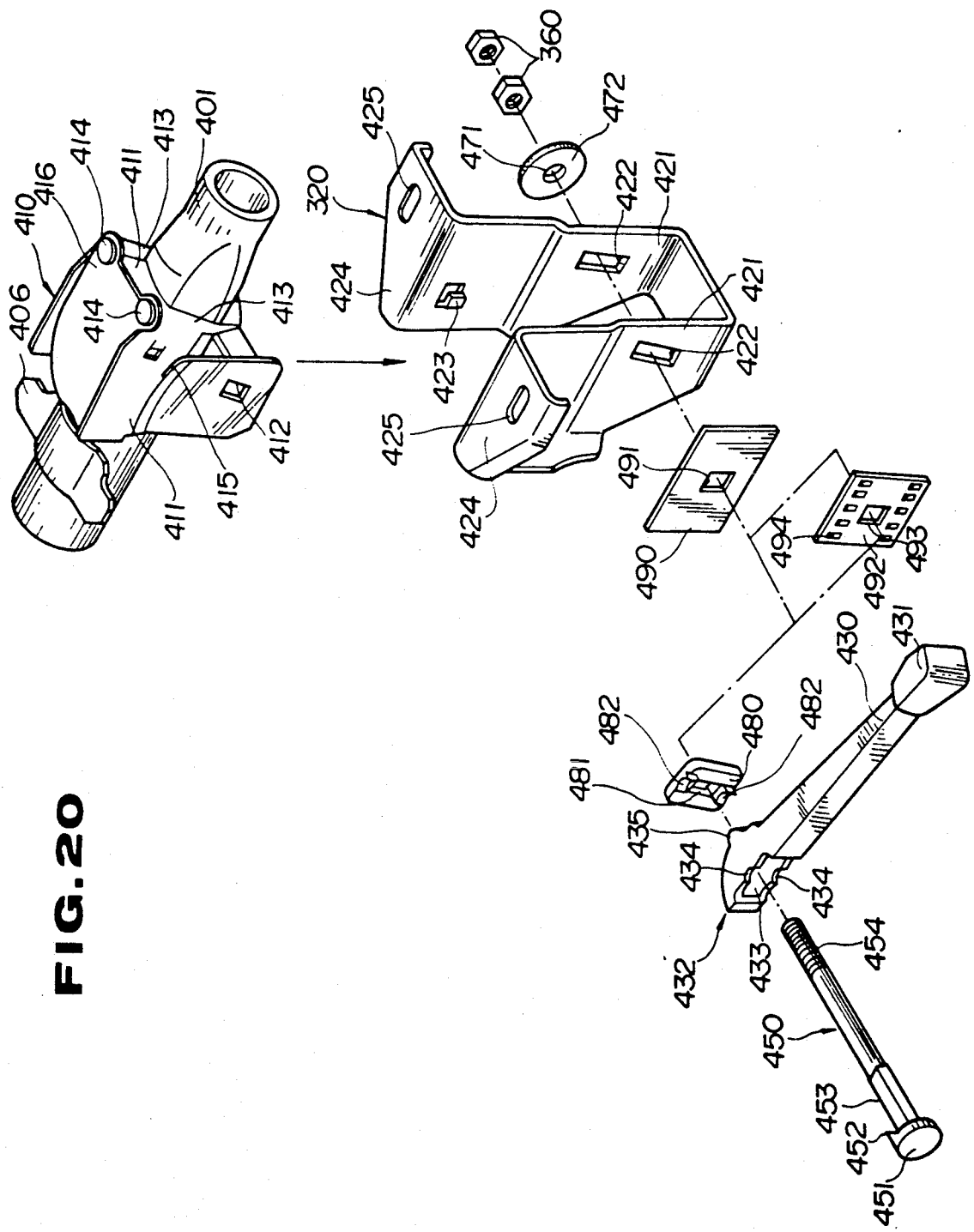
FIG. 20 is an exploded perspective view showing a significant portion of the tilting steering column of FIGS. 17 and 19.

As best shown in FIG. 20, the bolt 450 has a head portion 451, a root portion 453 having a square-shaped cross-sectional area, and a portion having a circular cross-sectional area and terminating in a threaded end portion 454. The head portion 451 has two arcuate projections 452 formed diagonally of thereof. The threaded end portion 454 is inserted in a throughhole 474 formed in the washer 473 and it engages with the nuts 460.

The distance bracket member 410 has a pair of upright wall portions 411 each having a square opening 412 having a size suitable for insertion of the square root portion 452 of the bolt 450. Preferably, the square openings 412 have a size equal or somewhat greater than that of the square root portion 453 to prevent the bolt 450 from rotating therein. The upright wall portions 411 extend in spaced-parallel relation to each other for receiving the upper jacket 401 between them. The upper jacket 401 is welded to the upright wall portions 411. The distance bracket member 410 is of the type having a safety structure for absorbing impact energy when the driver comes into collision against the steering wheel in a traffic accident. For this purpose, each of the upright wall portions 411 has a curled portion 413 through which a roller 414 extends and a slit 415. When the distance bracket member 410 is subject to impact energy, the upright wall portions 411 tear from the respective slits 415 and the curled portions 413 roll up with movement of the upper jacket 401 so as to absorb the impact energy. A cover 416, which may be made of a synthetic resin, is provided for covering the upper surface of the upper jacket 401. The cover 416 is formed in its front end portion with holes through which the respective rollers 414 extend and it extends to the holder 406.

The upper clamp member 420 has a pair of upright wall portions 421 each having a rectangular opening 422 and a projection 423 struck outwardly for resilient gripping engagement with the distance bracket member 410. The upright wall portions 421 extend in spaced-parallel relation to each other for receiving the distance bracket member 410 between them. Each of the upright wall portions 421 terminates in a wing portion 424 turned at right angles for contact with the vehicle. The upper clamp member 420 is fixed to the vehicle by means of bolts (not shown) inserted in bolt holes 425 formed in the respective wing portions 424. The rectangular openings 422 have a width suitable for insertion of the square root portion 453 of the bolt 450 and a length greater than the width for movement of the square root portion 453 in the direction of the length of the rectangular opening 422 during steering column tilting operation. The distance bracket member 410 is placed between the upright wall portions 421 of the upper clamp member 420. When the distance bracket member 410 is placed in position, the square openings 412 are in alignment with the rectangular openings 422.

The fixture portion 432 of the tilt lever 430 has an opening 433 in which the square root portion 452 of the bolt 450 is inserted. Cutouts 434 are formed in the end surface of the wall defining the opening 433. The cutouts 334 conform generally to the arcuate projections 452 formed on the head portion 451 of the bolt 450 for engagement with the projections 452, respectively, so that the fixture portion 432 can rotate about an rotation axis extending in a direction normal to the axis of the bolt 450; that is, from the top of one of the arcuate projections 452 to the top of the other arcuate projection 452. The fixture portion 432 has a pair of arcuate projections 435 each having an arcuate sliding surface 436. The arcuate projections 435 extend in spaced-parallel relation to each other and extend in a direction parallel to the axis of the bolt 450.

The sliding plate 480 has a sliding surface for sliding contact with the adjacent upright wall portion 421 of the upper clamp member 420, and an opening 481 having a size suitable for loose insertion of the square root portion 453 of the bolt 450 so that it can slide on the adjacent upright wall portion 421 of the upper clamp member 420 with respect to the bolt 450. The sliding plate 480 has recesses 482 generally conforming to the arcuate projections 435 formed on the fixture portion 432 of the tilt lever 430 for sliding engagement with the projections 435, respectively.

Figure 18:
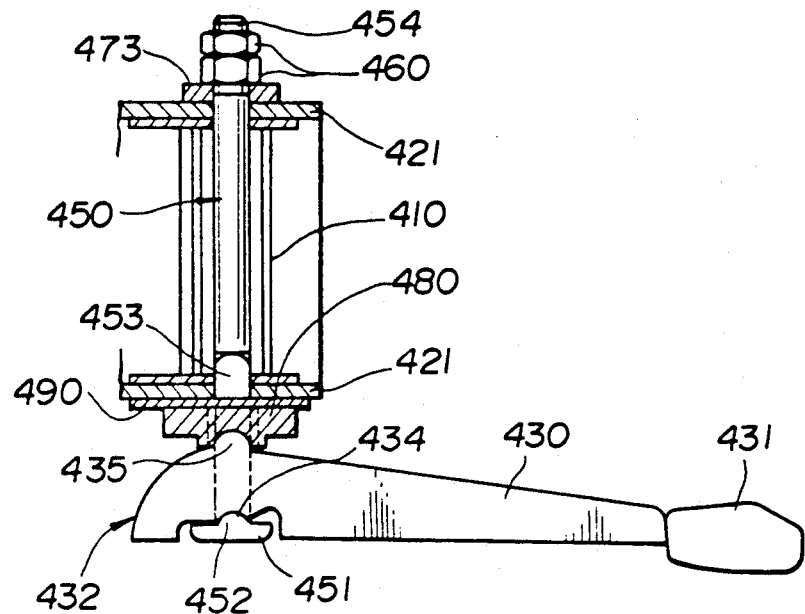
FIG. 18 is a sectional view showing a significant portion of the tilting steering column of FIG. 17.

As best shown in FIGS. 18 and 20, a washer member 491 is mounted on the bolt 450 between the adjacent one of the upright wall portions 421 of the upper clamp member 420 and the sliding surface of the sliding member 480. The use of the washer member 491 is effective to facilitate the sliding movement of the sliding member 480 with respect to the adjacent upright wall portion 421. The washer member 490 has a square opening 491 having a size suitable for insertion of the square root portion 453 of the bolt 450 and a contact surface held in sliding contact with the sliding surface of the sliding member 480. Preferably, at least one of the sliding surface of the sliding member 480 and the contact surface of the washer member 490 is coated with a material such as low frictional resin or the like having a low friction factor.

Figure 19:
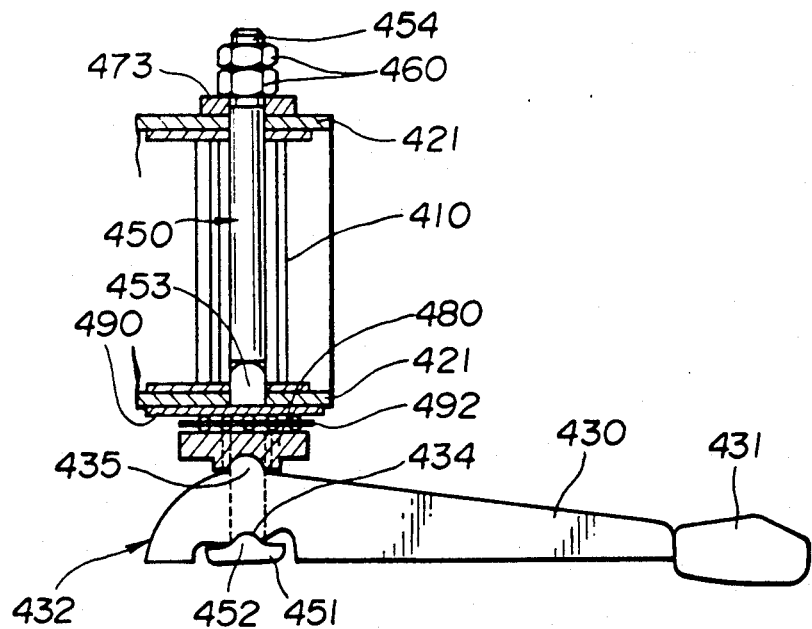
FIG. 19 is a sectional view showing a significant portion of a modified form of the tilting steering column of FIG. 17.

As best shown in FIGS. 19 and 20, a needle bearing member 492 may be mounted on the bolt 450 between the contact surface of the washer member 490 and the sliding surface of the sliding member 480. The use of the needle bearing member 492 is effective to further facilitate the sliding movement of the sliding member 480 with respect to the adjacent upright wall portion 421. The needle bearing member 492 has a square opening 493 having a size suitable for insertion of the square root portion 453 of the bolt 450 and a plurality of needle bearings 494 arranged, as shown in FIG. 20, to rotate in a direction of sliding movement of the sliding member 480.

Figure 21:
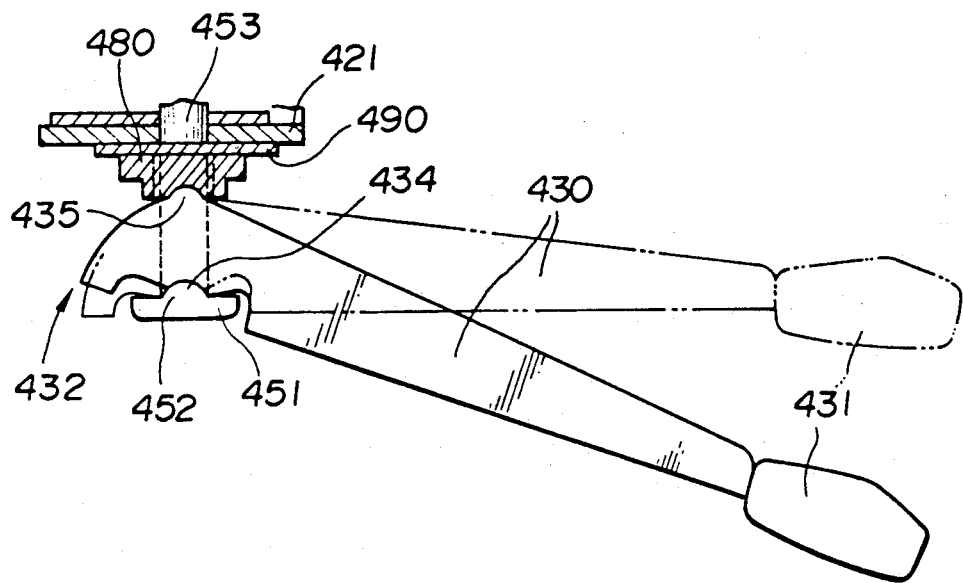
FIGS. 21 and 22 are sectional views used in explaining the operation of the tilting steering column of FIGS. 17 and 19.
Figure 22:
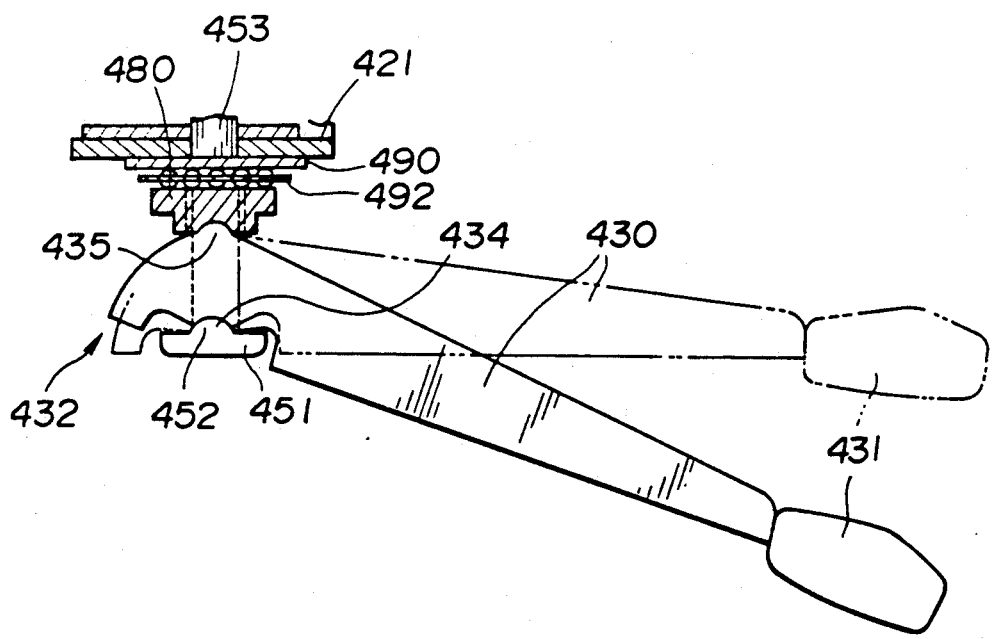

The steering column tiling operation will be described with reference to FIGS. 21 and 22. The tilt lever 430 is normally in a first position where the projections 435 are in parallel with the axis of the bolt 450, as indicated by the phantom lines of FIGS. 21 and 22. In the first position, the projections 435 separate the sliding plate 480 a first distance away from the rotation axis of the fixture portion 432 to retain a force required for the upper clamp member 420 to provide frictional clamping engagement with the distance bracket 410 so as to fix the distance bracket 410 to the upper clamp member 420. When the driver operates the operation knob 431 to move the tilt lever 440 away from the upper clamp member 420 from the first position, the fixture portion 432 rotates about the rotation axis (the arcuate projections 452) held in engagement with the respective recesses 434 formed in the fixture portion 432. As a result, the projections 435 are inclined with respect to the axis of the bolt 450 to slide the sliding member 480 on the adjacent upright wall portion 421 of the upper clamp member 420. The sliding movement of the sliding member 480 is made smoothly by means of the washer member 490 and/or the needle bearing member 494. Upon arrival of the tilt lever 430 at a second position indicated by the solid lines of FIGS. 21 and 22, the sliding member 480 is spaced a second distance smaller than the first distance away from the rotation axis of the fixture portion 432 of the tilt lever 430. This decreases the force applied between the upright wall portions 421 of the upper clamp member 420 to an extent releasing the frictional clamping engagement of the upper clamp member 420 with the distance bracket member 410 and permits the driver to tilt the steering column at a desired angle. To set the steering column at the desired angle, the driver may operate the operation knob 431 to rotate the tilt lever 430 from the second position to the first position where the force increases to an extent sufficient for the upper clamp member 420 to provide frictional clamping engagement with the distance bracket member 410 between the upright wall portions 421.

In this embodiment, the washer member 490 and/or the needle bearing member 492 are provided to provide smooth sliding movement of the sliding member 480 with respective to the upright wall portion 421 and minimize sliding member wear. This is effective to provide a good feed during steering column tilting operation. A material having a low friction factor may be coated on the sliding surface of the sliding member 480 or the contact surface of the washer member 490 to provide further smooth sliding movement of the sliding member 480.

What is claimed is:

1. A tilting steering column including a column jacket housing a steering shaft of an automotive vehicle, comprising:

a bracket member to which the column jacket is fixed;

a clamp member fixed to the vehicle for clamping the bracket member;

a bolt extending through the bracket and clamp members;

nut means for securing the bolt to produce a force required for the clamp member to provide frictional clamping engagement with the bracket member so as to fix the column jacket to the vehicle;

cam means having first and second members mounted on the bolt, the first member being held in contact with the clamp member, the second member being held in sliding engagement with the first member, the second member being movable between first and second positions, the second member being at the first position to retain the frictional clamping engagement, the second member being at the second position to decrease the force so as to release the frictional clamping engagement;

a lever for moving the second member between the first and second positions; and means, cooperating with at least one of said first and second members of said cam means, for resiliently holding resilient engagement between said first and second members for restricting movement of said lever at said second position.

2. The tilting steering column as claimed in claim 1, wherein the first member is associated with the clamp member to prevent rotation of the first member, the second member being movable along the bolt, the second member being at a first distance with respect to the clamp member at the first position, the second member is at a second distance with respect to the clamp member at the second position, the second distance being smaller than the first distance.

3. A tilting steering column including a column jacket housing a steering shaft of an automotive vehicle, comprising:

a bracket member to which the column jacket is fixed;

a clamp member fixed to the vehicle for clamping the bracket member;

a bolt extending through the bracket and clamp members;

nut means for securing the bolt to produce a force required for the clamp member to provide frictional clamping engagement with the bracket member so as to fix the column jacket to the vehicle;

cam means having first and second members mounted on the bolt, the first member being held in contact with the clamp member, the second member being held in sliding engagement with the first member, the second member being movable between first and second positions, the second member being at the first position to retain the frictional clamping engagement, the second member being at the second position to decrease the force so as to release the frictional clamping engagement, at least one of the first and second members including a resilient member held in resilient engagement with the other member, said first member being associated with the clamp member to prevent rotation of said first member, the second member being movable along the bolt and being at a first distance with respect to the clamp member at the first position, the second member being at a second distance with respect to the clamp member at the second position, which second distance is smaller than said first distance, and said second member being formed as a unit with said nut means; and a lever for moving the second member between the first and second positions.

4. The tilting steering column as claimed in claim 3, wherein the nut means is fixed to the lever.

5. The tilting steering column as claimed in claim 4, further comprising limiting means for limiting movement of the lever over a position where the second member is at the first position and over a position wherein the second member is at the second position.

6. The tilting steering column as claimed in claim 5, wherein the limiting means includes a recess formed in the lever, and a stopper member provided on the first member for sliding movement within the recess.

7. The tilting steering column as claimed in claim 2, wherein the second member is rotatable about a rotation axis perpendicular to the axis of the bolt, the second member positioning the first member at a first distance with respect to the at the first position, the second member positioning the first member at a second distance with respect to the rotation axis at the second position, the first distance being greater than the second distance.

8. A tilting steering column including a column jacket housing a steering shaft of an automotive vehicle, comprising:

a bracket member to which the column jacket is fixed;

a clamp member fixed to the vehicle for clamping the bracket member;

a bolt extending through the bracket and clamp members;

nut means for securing the bolt to produce a force required for the clamp member to provide frictional clamping engagement with the bracket member so as to fix the column jacket to the vehicle;

cam means having first and second members mounted on the bolt, the first member being held in contact with the clamp member, the second member being held in sliding engagement with the first member, the second member being movable between first and second positions, the second member being at the first position to retain the frictional clamping engagement, the second member being at the second position to decrease the force so as to release the frictional clamping engagement, at least one of the first and second members including a resilient member held in resilient engagement with the other member, said first member being associated with the clamp member to prevent rotation of said first member, the second member being movable along the bolt and being at a first distance with respect to the clamp member at the first position, the second member being at a second distance with respect to the clamp member at the second position, which second distance is smaller than said first distance, wherein the second member is rotatable about a rotation axis perpendicular to the axis of the bolt, the second member positioning the first member at a first distance with respect to the rotation axis at the first position, the second member positioning the first member at a second distance with respect to the rotation axis at the second position, the first distance being greater than the second distance, and wherein the first member has a flat surface for engagement with the second member, and the second member has first and second continuous surfaces, the first surface being in parallel with the flat surface of the first member at the first position, the second surface being inclined at an angle with respect to the first surface, the second surface being in parallel with the flat surface of the first member at the second position; and a lever for moving the second member between the first and second positions.

9. The tilting steering column as claimed in claim 8, wherein the resilient member is placed to cover the first and second surfaces of the second member.

10. A tilting steering column including a column jacket housing a steering shaft of an automotive vehicle, comprising:

a bracket member to which the column jacket is fixed;

a clamp member fixed to the vehicle for clamping the bracket member;

a bolt extending through the bracket and clamp members;

nut means for securing the bolt to produce a force required for the clamp member to provide frictional clamping engagement with the bracket member so as to fix the column jacket to the vehicle;

a slider having an opening through which the bolt extends, the slider having a sliding surface for sliding contact with the clamp member, the sliding surface being coated with a material having a low frictional factor; and a lever provided at a one end thereof with a fixture portion mounted on the bolt for rotation about a rotation axis perpendicular to the axis of the bolt between first and second positions, the fixture portion being associated with the slider for sliding the slider on the clamp member, the fixture portion being at the first position to separate the slider a first distance from the rotation axis to retain the frictional clamping engagement, the fixture portion being at the second position to separate the slider a second distance smaller than the first distance so as to decrease the force and release the frictional clamping engagement.

11. A tilting steering column including a column jacket housing a steering shaft of an automotive vehicle, comprising:

a bracket member to which the column jacket is fixed;

a clamp member fixed to the vehicle for clamping the bracket member;

a bolt extending through the bracket and clamp members;

nut means for securing the bolt to produce a force required for the clamp member to provide frictional clamping engagement with the bracket member so as to fix the column jacket to the vehicle;

a slider having an opening through which the bolt extends, the slider having a sliding surface for sliding movement with respect to the clamp member;

a lever provided at a one end thereof with a fixture portion mounted on the bolt for rotation about a rotation axis perpendicular to the axis of the bolt between first and second positions, the fixture portion being associated with the slider for sliding the slider on the clamp member, the fixture portion being at the first position to separate the slider a first distance from the rotation axis to retain the frictional clamping engagement, the fixture portion being at the second position to separate the slider a second distance smaller than the first distance so as to decrease the force and release the frictional clamping engagement; and a washer mounted on the bolt between the clamp member and the slider, the washer having a contact surface held in sliding contact with the sliding surface of the slider.

12. The tilting steering column as claimed in claim 11, wherein the sliding surface of the slider is coated with a material having a low friction factor.

13. The tilting steering column as claimed in claim 11, wherein the contact surface of the washer is coated with a material having a low friction factor.

14. The tilting steering column as claimed in claim 11, further including a needle bearing member mounted on the bolt between the sliding surface of the slider and the contact surface of the washer.

15. A tilting steering column including a column jacket housing a steering shaft of an automotive vehicle, comprising:

a bracket member to which the column jacket is fixed;

a clamp member fixed to the vehicle for clamping the bracket member;

a bolt extending through the bracket and clamp members;

nut means for securing the bolt to produce a force required for the clamp member to provide frictional clamping engagement with the bracket member so as to fix the column jacket to the vehicle;

cam means having first and second members mounted on the bolt, the first member being held in contact with the clamp member, the second member being held in sliding engagement with the first member, the second member being movable between first and second positions, the second member being at the first position to retain the frictional clamping engagement, the second member being at the second position to decrease the force so as to release the frictional clamping engagement, at least one of the first and second members including a resilient member held in resilient engagement with the other member, said first member being associated with the clamp member to prevent rotation of said first member, the second member being movable along the bolt and being at a first distance with respect to the clamp member at the first position, the second member being at a second distance with respect to the clamp member at the second position, which second distance is smaller than said first distance, said second member having a projected pattern held in engagement with the first member, and said first member including a resilient plate having an opening substantially conforming to the projected pattern and struck projections for resilient engagement with the first member; and a lever for moving the second member between the first and second positions.

16. A tilting steering column including a column jacket housing a steering shaft of an automotive vehicle, comprising:

a bracket member to which the column jacket is fixed;

a clamp member fixed to the vehicle for clamping the bracket member;

a bolt extending through the bracket and clamp members;

nut means for securing the bolt to produce a force required for the clamp member to provide frictional clamping engagement with the bracket member so as to fix the column jacket to the vehicle;

cam means having first and second members mounted on the bolt, the first member being held in contact with the clamp member, the second member being held in sliding engagement with the first member, the second member being movable between first and second positions, the second member being at the first position to retain the frictional clamping engagement, the second member being at the second position to decrease the force so as to release the frictional clamping engagement, at least one of the first and second members including a resilient member held in resilient engagement with the other member, said first member being associated with the clamp member to prevent rotation of said first member, the second member being movable along the bolt and being at a first distance with respect to the clamp member at the first position, the second member being at a second distance with respect to the clamp member at the second position, which second distance is smaller than said first distance, wherein the second member is rotatable about a rotation axis perpendicular to the axis of the bolt, the second member positioning the first member at a first distance with respect to the rotation axis at the first position, the second member positioning the first member at a second distance with respect to the rotation axis at the second position, the first distance being greater than the second distance; and a lever for moving the second member between the first and second positions, wherein the second member is formed as a unit with the lever.

* * * * *